3,666,557
NOVEL STARCH GELS AND PROCESS FOR MAKING SAME

Edward R. Jensen, Hinsdale, John E. Long, Western Springs, and Leamon D. Williams, Palos Heights, Ill., assignors to CPC International Inc.
No Drawing. Filed Nov. 10, 1969, Ser. No. 875,545
Int. Cl. A23l 1/06; C13l 1/08
U.S. Cl. 127—32                                    4 Claims

ABSTRACT OF THE DISCLOSURE

Starch gels which approximate closely, in physical appearance, in mouthing characteristics, and in structure, gels made from gelatin, are prepared by subjecting an aqueous slurry of an amylose-containing starch which has a bound fat content of less than about 0.3% to a relatively high temperature (generally between about 158° F. and 220° F.) and a high degree of shear. The conditions of temperature and degree of shear should be such as to cause substantially complete disruption of the starch granules coupled with substantially no molecular degradation. The resulting starch gels can be used as extenders or complete replacements for gelatin in many applications in which gelatin is customarily employed, e.g. in food products such as molded salads and desserts, in the manufacture of hard capsules, and as encapsulating agents in the microencapsulation of sensitive materials.

---

The invention relates to novel starch gels and the process of making same.

Practically everyone is familiar with the differences between a gel formed from gelatin and one formed from starch. These differences will be readily apparent if one visualizes two dessert preparations, the one being a gelatin-based dessert (e.g. Jello Brand gelatin dessert, manufactured by General Foods Corp.), the other being a cooked starch based pudding, prepared from any one of a number of packaged pudding powders presently on the consumer market. The gelatin gel is considerably more firm and elastic than the starch gel. When the dish of gelatin dessert is moved or shaken slightly, the gelatin "shimmies" in a manner altogether different from that of the starch pudding. When a spoon or knife is inserted into the gelatin dessert it cleaves, or fractures, sharply; in fact, one can take a knife and cut the gelatin gel into discrete pieces, e.g. cubes, which pieces will retain their identity. If the pudding is cut with a knife it simply flows back to its original form. The mouthing characteristics of the two desserts are also substantially different. The pudding has a "smeary" feel in the mouth; when the gelatin dessert is taken into the mouth it fractures and then somewhat "melts away."

In accordance with the present invention, starch gels have been developed which have exceptionally high gel strength and which approximate closely, in physical appearance, mouthing characteristics, and structure, those made from gelatin. In addition to their utility in food products such as desserts, molded salads, and the like, they can also be used as extenders or complete replacements for gelatin in many applications, such as hard capsules, microencapsulation of sensitive materials, etc.

It is an object of the present invention to prepare starch gels characterized by exceptionally high gel strength, cohesiveness, and elasticity.

A further object is to prepare starch gels for use in foodstuffs which have many of the characteristics of gelatin-based gels.

Another object is to modify starch in such a way as to form a gelatin-like gel.

An additional object is to prepare starch gels which can be used as extenders or complete replacements for gelatin in many food and industrial applications.

Another object is to prepare hard capsules for pharmaceutical use and the like containing a substantial amount of starch.

An additional object is to protect sensitive materials by microencapsulation wherein a starch-based gel is employed as the microencapsulating agent.

Additional objects and advantages will become apparent from reading the following specification and claims.

Briefly, the starch gels of the present invention can be prepared by subjecting an aqueous slurry of an amylose-containing starch which has a bound fat content of less than about 0.3% to a temperature sufficiently high to cause substantially complete disruption of the starch granules and to a high degree of shear, the conditions of temperature and degree of shear being such as to avoid substantial molecular degradation.

The particular temperature range operable in the practice of the invention will depend upon the type of starch used; it is essential that the temperature be sufficiently high to completely gelatinize the starch, i.e., cause disruption of the granules; on the other hand, it must be sufficiently low so as to avoid degradation of the starch molecules themselves. In the case of corn starch, the temperature can range from about 158° F. to about 220° F., the preferred range being between about 175° F. and 195° F.

The cooked paste, either during the cooking operation or preferably after completion of same, must be subjected to a high degree of shear, on the order of that obtained by means of a conventional milk homogenizer, which consists of a high pressure pump which forces the liquid through a spring loaded orifice. A colloid mill would also be suitable, but not as effective as a homogenizer.

As a starting material, any amylose-containing starch may be employed, including the high amylose starches, or the pure amylose fraction obtained by fractionating an amylose-containing starch. Amylopectin, or the waxy starches which are composed of substantially all amylopectin, do not form gels upon pasting, and therefore are not suitable for the practice of the invention. The amylose-containing starch can be modified and/or derivatized, provided that it is capable of gelatinizing and will form a gel. It is essential that the starch be defatted, i.e. that the bound fat content be less than about 0.3%. Most native starches contain between 0.6 and 0.8% bound fat. There are many methods known to the art for defatting starches, e.g. by solvent extraction, or the like. The method used for lowering the fat content is immaterial to the practice of the invention, the only requirement being that the bound fat content of the starch be les sthan about 0.3% and preferably about 0.15% or less.

The resultant product is characterized by exceptionally high gel strength, elasticity, and is remarkably similar in physical appearance and mouthing characteristics to a gelatin-based gel.

It is theorized that the resultant gels are characterized by substantially no intact granules coupled with substantially no molecular degradation, in addition to their having a bound fat content of less than about 0.3%.

The following examples will serve to illustrate the practice of the invention. They are presented for illustrative purposes only, and should not be considered as limiting the scope of the claims in any way.

EXAMPLE I

A series of 12 slurries were prepared in the following manner. Six slurries, designated by the numbers 1 through 6, were made up using an acid modified thin boiling (67 fluidity) corn starch, which had not been defatted. The slurries contained 8.5% solids, by weight. The remaining slurries, designated as 7 through 12, were made up from acid modified thin boiling (67 fluidity) corn starch which had been defatted to a bound fat content of between 0.1% and 0.15%. These slurries contained 6.5% solids, by weight.

Each slurry was placed in a steam-jacketed kettle and cooked at a specified temperature for a period of 25 minutes. Samples were removed at time intervals of 5 minutes, 15 minutes and 25 minutes after the slurries had reached cooking temperature. After cooking, the samples taken from slurries 4, 5, 6, 10, 11 and 12 were homogenized in a Creamery Package Homogenizer at 2,000 p.s.i. at the first stage and 500 p.s.i. at the second stage.

Each sample was collected in a beaker, permitted to stand for 20 to 24 hours at 40° F., after which gel strengths were determined using a Bloom Gelometer.

Conditions of treatment, and the Bloom gel strengths in grams are set forth in Table I.

TABLE I

| Sample Number | Defatted? | Cook temp., °F. | Time (min.) | Homogenized? | Bloom gel strength (gms.) |
|---|---|---|---|---|---|
| 1 | No | 158 | 5 | No | 0 |
|  |  |  | 15 |  | 0 |
|  |  |  | 25 |  | 20 |
| 2 | No | 176 | 5 | No | 96 |
|  |  |  | 15 |  | 100 |
|  |  |  | 25 |  | 108 |
| 3 | No | 194 | 5 | No | 112 |
|  |  |  | 15 |  | 120 |
|  |  |  | 25 |  | 118 |
| 4 | No | 158 | 5 | Yes | 60 |
|  |  |  | 15 |  | 72 |
|  |  |  | 25 |  | 67 |
| 5 | No | 176 | 5 | Yes | 88 |
|  |  |  | 15 |  | 98 |
|  |  |  | 25 |  | 101 |
| 6 | No | 194 | 5 | Yes | 88 |
|  |  |  | 15 |  | 103 |
|  |  |  | 25 |  | 89 |
| 7 | Yes | 158 | 5 | No | 52 |
|  |  |  | 15 |  | 60 |
|  |  |  | 25 |  | 75 |
| 8 | Yes | 176 | 5 | No | 60 |
|  |  |  | 15 |  | 69 |
|  |  |  | 25 |  | 94 |
| 9 | Yes | 194 | 5 | No | 72 |
|  |  |  | 15 |  | 82 |
|  |  |  | 25 |  | 110 |
| 10 | Yes | 158 | 5 | Yes | 108 |
|  |  |  | 15 |  | 128 |
|  |  |  | 25 |  | 123 |
| 11 | Yes | 176 | 5 | Yes | 152 |
|  |  |  | 15 |  | 167 |
|  |  |  | 25 |  | 162 |
| 12 | Yes | 194 | 5 | Yes | 139 |
|  |  |  | 15 |  | 152 |
|  |  |  | 25 |  | 158 |

As can be seen from Table I, sample 10, 11 and 12, prepared in accordance with the invention, developed substantially greater gel strengths than did the remaining samples, which were not prepared in accordance with the invention. It is also interesting to note that in the case of the non-defatted starch, homogenization of the pastes cooked at the higher temperatures (176° F. and 194° F.) actually resulted in decreased gel strength. The substantial increase in gel strength resulting from homogenizing the pastes of defatted starch is readily apparent from the data in Table I.

In addition to measuring the gel strength, the samples were visually examined and tasted. The physical appearance and mouthing characteristics of samples 10, 11 and 12 were very similar to those of gelatin based gels, the principal difference being that the gels were hazy, rather than clear and transparent as is the case of gelatin based gels.

EXAMPLE II

Slurries were prepared as in Example I, i.e. aqueous slurries at 8.5% solids concentration of thin boiling (67 fluidity) non-defatted corn starch and slurries at 6.5% solids concentration of thin boiling defatted (0.1 to 0.15% bound fat content) corn starch. Portions of each slurry were pumped through a Spiratherm heater, which is a jacketed continuous starch heater employing hot water or steam as the heat source, at various temperatures. After pasting, half of each sample was homogenized as in Example I, and the gels were measured with an Instron Test Unit after standing for 20 to 24 hours at 40° F.

The Instron Test Unit measures and graphs the reacting force when a 1-inch diameter cylindrical plunger is moved at a distance of 1 inch into the gel at a constant rate of ½ inch per minute. The force is plotted on a chart as the plunger travels into the gel, each 0.1 inch travelled by the plunger being represented by 1.0 inch on the chart. Each Instron graph showed a force build-up followed by a drop-off, indicating a partial collapse of the gel. Following this initial drop-off, the force again increased throughout the remainder of the travel of the plunger. The maximum force, in grams, before the initial drop-off and the distance shown on the chart, in inches, before this drop-off, were recorded; these values are felt to be a good indication of the elasticity and resistance to shearing of the gel. Also, the maximum reacting force over the entire plunger travel was recorded, as an indication of the overall gel strength.

The treatment conditions, and Instron values, are set forth in Table II.

TABLE II

| Sample Number | Defatted? | Temp. °F. | Homogenized? | Force before drop-off (gms.) | Inches travelled (chart reading) before drop-off | Max. force generated (gms.) |
|---|---|---|---|---|---|---|
| 13 | No | 165 | No | | | |
| 14 | No | 185 | No | 66 | 1.6 | 138 |
| 15 | No | 210 | No | 109 | 2.1 | 194 |
| 16 | No | 225 | No | 47 | 3.2 | 68 |
| 17 | No | 240 | No | 58 | 2.4 | 97 |
| 18 | No | 165 | Yes | 76 | 2.6 | 112 |
| 19 | No | 185 | Yes | 78 | 2.0 | 146 |
| 20 | No | 210 | Yes | 60 | 2.0 | 98 |
| 21 | No | 225 | Yes | 58 | 2.0 | 104 |
| 22 | No | 240 | Yes | 51 | 1.9 | 94 |
| 23 | Yes | 165 | No | 40 | 1.2 | 62 |
| 24 | Yes | 185 | No | 105 | 2.0 | 137 |
| 25 | Yes | 210 | No | 220 | 2.9 | 203 |
| 26 | Yes | 225 | No | 250 | 3.05 | 245 |
| 27 | Yes | 240 | No | 135 | 1.75 | 181 |
| 28 | Yes | 165 | Yes | 240 | 2.65 | 240 |
| 29 | Yes | 185 | Yes | 300 | 3.6 | 300 |
| 30 | Yes | 210 | Yes | 265 | 3.25 | 228 |
| 31 | Yes | 225 | Yes | 195 | 2.65 | 205 |
| 32 | Yes | 240 | Yes | 112 | 1.46 | 145 |

As can be seen from the data in Table II, gels prepared in accordance with the invention (sample Nos. 28 through 30) had substantially greater elasticity, resistance to shear, and overall gel strength than the remaining samples. It will also be noted that at temperatures of 225° F. or higher the elasticities and gel strength decreased; it was also noted that these samples prepared at the higher temperatures were lower in intrinsic viscosity than those prepared at the lower temperatures, indicating that molecular degradation had probably taken place.

As was the case in Example I, the physical appearance and mouthing characteristics of the gels prepared in accordance with the invention were substantially similar to gelatin based gels.

EXAMPLE III

Example I was repeated, except the starch used was regular thick boiling (unmodified) corn starch, slurried in water in concentrations of 6.5% solids, by weight. Half of the slurries contained starch having the normal content of bound fat, while in the case of the remaining slurries the starch was solvent extracted to a bound fat content of about 0.15%. The gels were measured with an Instron Test Unit, as in Example II, and the "force before drop-off" and "maximum force" recorded.

TABLE III

| Sample Number | Defatted? | Cook temp., °F. | Time (min.) | Homogenized? | Instron readings (gms.) | |
|---|---|---|---|---|---|---|
| | | | | | Force before drop-off | Max. force generated |
| 33 | No | 158 | 5 / 15 / 25 | No | 15 / 0 / 0 | 0 / 0 / 30 |
| 34 | No | 176 | 5 / 15 / 25 | No | 85 / 105 / 105 | 100 / 170 / 210 |
| 35 | No | 194 | 5 / 15 / 25 | No | 140 / 160 / 275 | 130 / 280 / 230 |
| 36 | No | 158 | 5 / 15 / 25 | Yes | 45 / 35 / 35 | 50 / 60 / 100 |
| 37 | No | 176 | 5 / 15 / 25 | Yes | 60 / 50 / 40 | 130 / 140 / 150 |
| 38 | No | 194 | 5 / 15 / 25 | Yes | 60 / 60 / 60 | 260 / 160 / 160 |
| 39 | Yes | 158 | 5 / 15 / 25 | No | 110 / 150 / 110 | 150 / 250 / 330 |
| 40 | Yes | 176 | 5 / 15 / 25 | No | 320 / 360 / 600 | 320 / 530 / 650 |
| 41 | Yes | 194 | 5 / 15 / 25 | No | 530 / 800 / 760 | 590 / 850 / 900 |
| 42 | Yes | 158 | 5 / 15 / 25 | Yes | 280 / 320 / 700 | 650 / 630 / 700 |
| 43 | Yes | 176 | 5 / 15 / 25 | Yes | 590 / 600 / 700 | 600 / 600 / 830 |
| 44 | Yes | 194 | 5 / 15 / 25 | Yes | 300 / 560 / 600 | 520 / 640 / 640 |

Repetition of the example using rice starch, potato starch, wheat starch, or high amylose corn starch gives comparable results, i.e. those starches treated in accordance with the invention show generally higher gel strength, and are substantially "gelatin-like" in appearance and mouthing characteristics.

EXAMPLE IV

Example II was repeated, using slurries of regular thick boiling (unmodified) corn starch, which had the normal content of bound fat, at concentrations of 6.5% solids, and of thick boiling corn starch which had been defatted (bound fat content of about 0.15) at concentrations of 5.9% solids. The treatment conditions and Instron measurements are given in Table IV.

TABLE IV

| Sample Number | Defatted? | Temp., °F. | Homogenized? | Instron readings | | |
|---|---|---|---|---|---|---|
| | | | | Force before drop-off (gms.) | Inches travelled (chart) before drop-off | Max. force generated (gms.) |
| 45 | No | 172 | No | 0 | 9 | 0 |
| 46 | No | 180 | No | 90 | 9 | 100 |
| 47 | No | 190 | No | 210 | 3.9 | 220 |
| 48 | No | 210 | No | 135 | 5.0 | 180 |
| 49 | No | 172 | Yes | 75 | 3.3 | 230 |
| 50 | No | 180 | Yes | 65 | 3.4 | 180 |
| 51 | No | 190 | Yes | 50 | 3.5 | 130 |
| 52 | No | 210 | Yes | 50 | 3.6 | 120 |
| 53 | Yes | 175 | No | 240 | 2.9 | 270 |
| 54 | Yes | 190 | No | 210 | 3.2 | 290 |
| 55 | Yes | 200 | No | 380 | 4.6 | 380 |
| 56 | Yes | 210 | No | 420 | 5.6 | 450 |
| 57 | Yes | 220 | No | 430 | 6.1 | 440 |
| 58 | Yes | 260 | No | 440 | 4.9 | 380 |
| 59 | Yes | 175 | Yes | 670 | 6.2 | 660 |
| 60 | Yes | 190 | Yes | 465 | 5.8 | 530 |
| 61 | Yes | 200 | Yes | 495 | 5.8 | 500 |
| 62 | Yes | 210 | Yes | 485 | 6.4 | 480 |
| 63 | Yes | 220 | Yes | 420 | 5.6 | 440 |
| 64 | Yes | 260 | Yes | 150 | 3.6 | 220 |

As was the case in the preceding examples, the physical appearance and mouthing characteristics of the gels prepared in accordance with the invention (sample Nos. 59–63) were substantially similar to gelatin based gels.

EXAMPLE V

This example illustrates the use of starch prepared in accordance with the invention as a base for a dessert dish. A 6% aqueous slurry of thick boiling corn starch which had been defatted to a bound fat content of about 0.15% was prepared, and cooked over a water bath at 90° C. for 20 minutes. During the last 5 minutes of the cooking period sugar was added, and during the last minute of cooking a small quantity of flavors, citric acid, and sodium citrate was added. After cooking, the paste was passed through a laboratory hand-operated homogenizer. The product was then poured into dessert dishes and allowed to cool at room temperature. The resultant product was substantially similar in appearance to a gelatin-based dessert, except it was not as clear and transparent as a gelatin dessert; it had a hazy appearance, somewhat like a rennet dessert. The mouthing characteristics of the product were very similar to that of a gelatin dessert, and the flavor was excellent, no "cereal taste," characteristic of conventional starch-based food products, being detectable.

EXAMPLE VI

This example illustrates the use of starch prepared in accordance with the invention as an extender for gelatin in the preparation of hard capsules.

An aqueous slurry of 67 fluidity corn starch, which had been defatted to a bound fat content of about 0.15%, was prepared and cooked at 194° F. for 25 minutes, after which it was homogenized in accordance with the process of Example I. The paste was divided into 3 batches, and dry 240 Bloom gelatin powder was added to each batch, in amounts resulting in 5%, 10%, and 15% starch, by weight based on the total weight of the gelatin plus the starch. The gelatin was added with mixing, and the solutions were agitated until the gelatin had been fully dissolved and dispersed. A control batch was also prepared without any starch addition, by dissolving 240 Bloom gelatin in water at 60° C., the concentration being such that the viscosity of the solution was about 2,000 cps. Conventional food colors (F. D. & C. approved) were added to the hot solutions.

Stainless steel pins were dipped into the hot solutions, removed, and the material adhering to the pins was allowed to dry. When dry the capsules were removed from the pins and trimmed to size. The capsules made with the starch addition were very attractive, as hard as those made from gelatin alone, and took the dye as well as the gelatin capsules. The only apparent difference was that the capsules containing starch were somewhat less clear than those made from gelatin alone—they were more translucent but nevertheless, extremely attractive in appearance.

EXAMPLE VII

This example illustrates the use of starches prepared in accordance with the invention as extenders for, or complete replacements for, gelatin in the microencapsulation of sensitive materials such as vitamins, vegetable oils, or the like.

The process employed was generally that set forth in U.S. Pat. No. 3,143,475, Koff and Widmer, which issued Aug. 4, 1964.

Batch A

Thin-boiling starch and gelatin encapsulation of vitamin A palmitate 40 grams of 67 fluidity corn starch, which had been defatted to a bound fat content of about 0.15%, and 40 grams of corn syrup solids (42 D.E.) were mixed into 160 grams of water. The mixture was heated to 190° F. and held for about 30 minutes, after which it was sheared by passing it through a laboratory hand homogenizer. A second mixture was prepared consisting of 16.6 grams of 300 Bloom gelatin, 7.1 grams corn syrup solids (42 D.E.) and 74.8 grams water. The mixture was heated to about 122° F. to dissolve the gelatin, and was then added to the starch paste. 45.3 grams of vitamin A palmitate was also added to the mixture, and the product was homogenized at about 2500 p.s.i. with a laboratory hand homogenizer. The resultant emulsion was then pumped through a spray-head and sprayed into a vessel containing castor oil, the castor oil being at room temperature (about 70° F.). The temperature of the resultant slurry was lowered to about 50° F. and held at this temperature for about 30 minutes. Anhydrous ethyl alcohol was then added to the slurry, with stirring, to dehydrate the beadlets. The mixture was centrifuged and the beadlets recovered. Additional ethyl alcohol was added to the recovered beadlets, the mixture again centrifuged, and the beadlets were dried.

Batch B

Thick-boiling starch and gelatin encapsulation of vegetable oil

The process was repeated, using the following formula:

|  | Gms. |
|---|---|
| 300 Bloom gelatin | 1,700 |
| Water | 11,435 |
| Thick-boiling corn starch containing about 0.15% bound fat | 1,030 |
| 42 D.E. corn syrup solids | 840 |
| Vegetable oil | 1,920 |

Batch C

Starch (no gelatin) encapsulation of vitamin A palmitate

The process was repeated, using the following formula:

|  | Gms. |
|---|---|
| 67 fluidity corn starch containing about 0.15% bound fat | 13 |
| 42 D.E. corn syrup solids | 13 |
| Water | 87 |
| Vitamin A palmitate | 11 |

In all cases, the beadlets obtained were equal, in both quality and appearance, to beadlets prepared from gelatin alone.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention.

What is claimed is:

1. A process for preparing a starch gel having high gel strength comprising subjecting an aqueous slurry of an amylose-containing starch having a bound fat content of less than about 0.3% to a temperature sufficiently high to cause disruption of the starch granules and to a high degree of shear, the conditions of temperature and degree of shear being such as to avoid substantial molecular degradation said temperature being within the range of between about 158° F. and about 220° F.

2. A process in accordance with claim 1, wherein said starch is subjected to a temperature of within the range of between about 175° F. and about 195° F.

3. A process in accordance with claim 1, wherein the bound fat content of said starch is not more than about 0.15%.

4. A composition of matter consisting essentially of amylose-containing starch with a bound fat content of less than about 0.3% and water processed in the manner of claim 1 to give a starch gel having the following characteristics:
   (1) substantially no intact granules;
   (2) substantially no molecular degradation;
   (3) substantially higher gel strength than that of a paste of the parent starch not treated by the temperature and shear of the present process; and
   (4) a gel structure which fractures sharply when subjected to cleavage.

References Cited
UNITED STATES PATENTS

| | | | |
|---|---|---|---|
| 3,446,628 | 5/1969 | Schoch | 99—139 X |
| 2,266,051 | 12/1941 | Lebeson | 127—32 X |

MORRIS O. WOLK, Primary Examiner

S. MARANTZ, Assistant Examiner

U.S. Cl. X.R.

99—139; 106—210; 127—69; 252—316